No. 668,667. Patented Feb. 26, 1901.
M. WADDELL.
CHARGING SYSTEM FOR SECONDARY BATTERIES.
(Application filed Feb. 15, 1900.)
(No Model.)
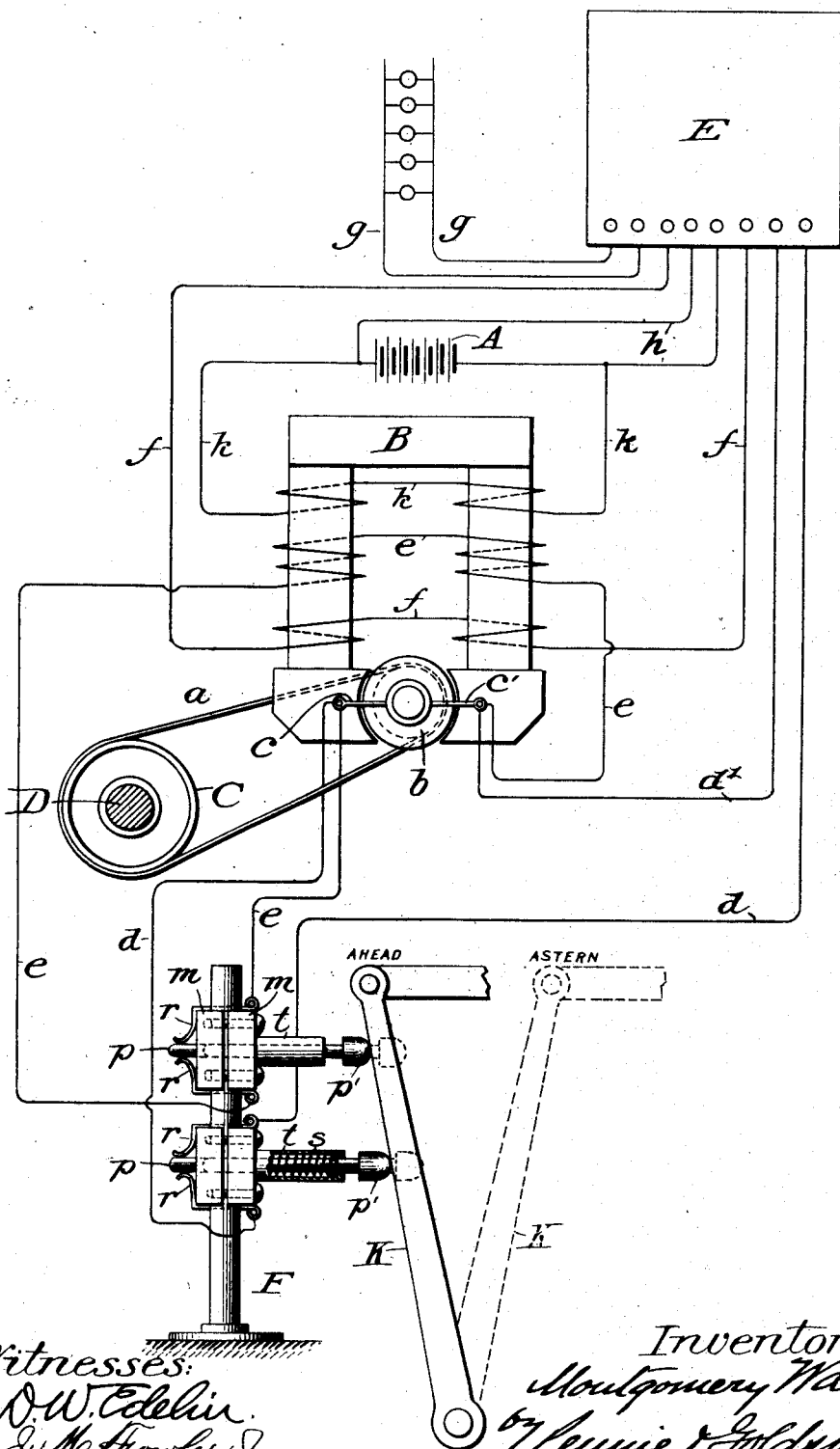
Witnesses:
D. W. Edelin
J. M. Fowler Jr.
Inventor:
Montgomery Waddell,
by Pennie & Goldsborough,
Attys.

UNITED STATES PATENT OFFICE.

MONTGOMERY WADDELL, OF NEW YORK, N. Y., ASSIGNOR TO THE ELECTRIC AXLE LIGHT AND POWER COMPANY, OF SAME PLACE.

CHARGING SYSTEM FOR SECONDARY BATTERIES.

SPECIFICATION forming part of Letters Patent No. 668,667, dated February 26, 1901.

Application filed February 15, 1900. Serial No. 5,276. (No model.)

*To all whom it may concern:*

Be it known that I, MONTGOMERY WADDELL, a subject of the Queen of Great Britain, residing at New York, county of New York, State of New York, have invented certain new and useful Improvements in Charging Systems for Secondary Batteries; and I do hereby declare the following to be a full, clear, and exact description of the invention, such as will enable others skilled in the art to which it appertains to make and use the same.

For supplying the electric-lighting circuits of tug-boats and the like, where the available space for the installation of any lighting plant whatever is necessarily limited, it is not unusual to charge the storage batteries from a dynamo driven from the shafting of the propeller-engine. Inasmuch as steam craft of this kind in plying their usual vocation are frequently obliged to back, reversing the propeller-engine sometimes for a considerable period of time, the accompanying reversal of the direction of rotation of the armature causes the dynamo to build up a reverse electromotive force, which tends to operate the automatic switch mechanism and short-circuit the batteries. A similar tendency exists in any secondary-battery plant wherein the charging-dynamo is driven by a motor whose direction of rotation is liable to be frequently reversed—as, for instance, a wind-wheel actuated by varying air-currents.

The purpose of my invention is to obviate this disadvantage, and, generally stated, it consists in interposing a circuit-breaker in either the main circuit leading from the dynamo to the switchboard or in one or more of the field-magnet circuits (preferably in the main shunt-winding thereof) or by interposing circuit-breakers both in the main circuit and in one or more of the field-magnet circuits and automatically opening said circuit or circuits through the instrumentality of the circuit breaker or breakers when the engine is reversed. By this expedient the dynamo is altogether prevented from building up during reversal of the engine an electromotive force to throw the automatic switch and short-circuit the batteries.

In the accompanying drawing I have illustrated diagrammatically a secondary-battery plant exhibiting one form or embodiment of my invention.

Referring to the drawing, A indicates a battery, B a differentially-wound charging-dynamo, and C a driving-pulley mounted preferably upon the main shaft D of the propeller and geared by a belt $a$ to a driving-pulley of the armature $b$. The dynamo or generator B is provided with the usual brushes $c$ $c'$, from which are derived the main leads $d$ $d'$ and the main shunt $e$.

E indicates the customary switchboard for the terminals of the main leads, the series differential winding $f$, the consumption-circuit $g$, and the battery-circuit $h$, from which the separately-excited winding $k$ is derived.

In the drawing I have shown a circuit maker and breaker in both the main circuit and the main shunt-circuit of the generator. The particular type of circuit maker and breaker employed will depend upon local conditions and is of secondary importance. I have found it convenient, however, to construct its main body portion of two blocks $m$ of vulcanite or like suitable insulating material, adapted to be clamped upon a pipe-bracket F by screws, as shown, so as to be readily adjustable and removable. Upon these blocks are mounted the contact-springs $r$, between which electrical connection may be established, as hereinafter described, by the metallic plunger $p$, having a head $p'$ of insulating material. Spiral springs $s$, located within guide-tubes $t$, encircle the plungers $p$ and bear against shoulders thereon and tend to throw the plungers into the position shown in dotted lines, thereby breaking the circuits. I locate these contact makers and breakers in such relation to some part of the reversing-gear of the propeller that when said gear is actuated the circuits will be automatically opened. To this end the plungers $p$ may conveniently be placed in line with the reversing-lever K, so that when the lever is thrown forward to start the craft ahead, as indicated, the plungers $p$ will be moved inwardly against the resistance of the springs $s$ and will make firm rubbing contact with the spring-contacts $r$, thereby completing the circuits. On the other hand, when the lever K is reversed to back the craft, the plungers $p$ move outwardly into the dotted-line positions and break the circuits. It will accordingly be seen that when the tug-boat engine or other reversible motor is going ahead the circuits are automatically made and that when the engine or other motor is reversing the circuits governed by the contact makers and breakers are broken. The plant is thereby in full charging adjustment at the time desired and at other times the dynamo is unable to build up.

As hereinbefore intimated, I do not limit myself to locating the circuit maker and breaker in any particular one of the dynamo-circuits, nor do I restrict myself to the employment of a circuit maker and breaker in both the main circuit and main shunt thereof. I prefer, however, for most purposes the latter arrangement, for the reason that it insures absolute severance of the charging-circuit, and for the further reason that by so arranging the plungers $p$ that the main shunt will be broken immediately before the main circuit sparking in breaking the main circuit will be lessened.

So far as I am aware it is broadly new to provide means, actuated by the reversing-gear of the engine, to prevent the generator from building up when the engine is reversed, and I desire, therefore, that my invention be given a correspondingly broad interpretation.

Having thus described my invention, what I claim, and desire to secure by Letters Patent, is—

1. In a charging system for secondary batteries, comprising a secondary battery, a charging-dynamo, and a reversible engine or motor for driving the dynamo, the combination with the reversing-gear of the engine, of means brought into actuation thereby for preventing the dynamo from building up during reversal; substantially as described.

2. In a charging system for secondary batteries, comprising a secondary battery, a charging-dynamo, and a reversible engine or motor for driving the dynamo, the combination with the reversing-gear of the engine, of means brought into actuation thereby for preventing the dynamo from building up during reversal, said means consisting of a circuit-breaker interposed in a circuit of the dynamo to break the circuit upon the reversing movement of the engine or motor, substantially as described.

3. In a charging system for secondary batteries, comprising a secondary battery, a charging-dynamo, and a reversible engine or motor for driving the dynamo, the combination with the reversing-gear of the engine, of means brought into actuation thereby for preventing the dynamo from building up during reversal, said means consisting of a circuit-breaker interposed in a circuit of the dynamo, supplemented by another circuit-breaker interposed in another circuit of the dynamo to break the circuit upon the reversing movement of the engine or motor, substantially as described.

4. In a charging system for secondary batteries, comprising a secondary battery, a charging-dynamo, and a reversible engine or motor for driving the dynamo, the combination with the reversing-gear of the engine, of means brought into actuation thereby for preventing the dynamo from building up during reversal, said means consisting of a circuit-breaker in the main shunt of the dynamo, supplemented by another circuit-breaker in the main dynamo-circuit, substantially as described.

5. In a charging system for secondary batteries, comprising a secondary battery, a charging-dynamo, and a reversible engine or motor for driving the dynamo, the combination with the reversing-gear of the engine, of means brought into actuation thereby for preventing the dynamo from building up during reversal, said means consisting of a circuit-breaker in the main shunt of the dynamo, supplemented by another circuit-breaker in the main dynamo-circuit, the first circuit-breaker being adapted to break the shunt immediately before the main circuit is broken; substantially as described.

In testimony whereof I affix my signature in presence of two witnesses.

MONTGOMERY WADDELL.

Witnesses:
 EAD. E. SCHMIDT,
 J. FRANKEL.